(No Model.)
R. E. WOODRUFF.
COMBINED RULE, SQUARE, BEVEL, SCRIBE GAGE, SPIRIT LEVEL, AND DIVIDERS.
No. 439,458. Patented Oct. 28, 1890.
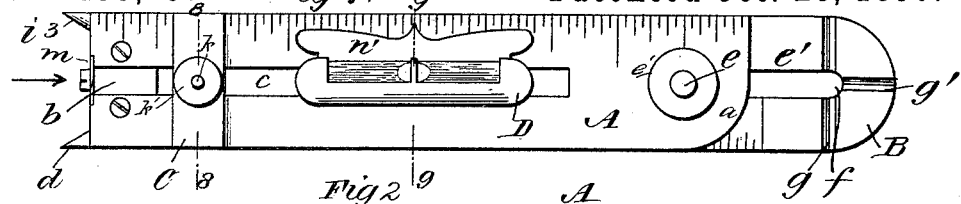
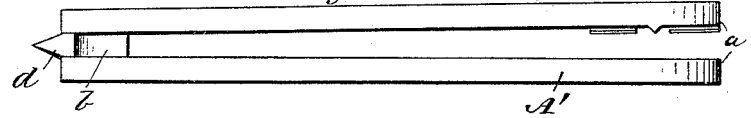
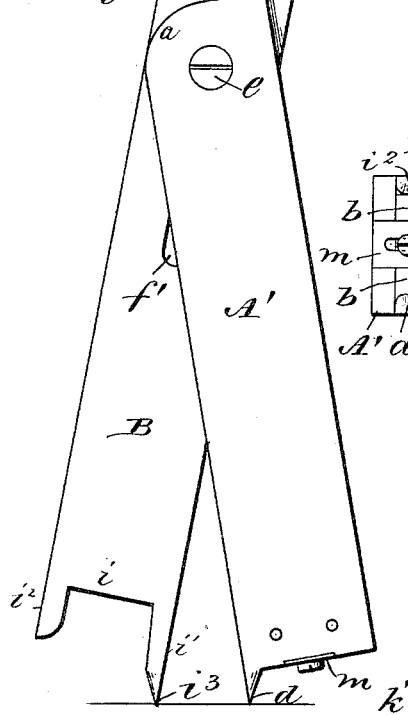
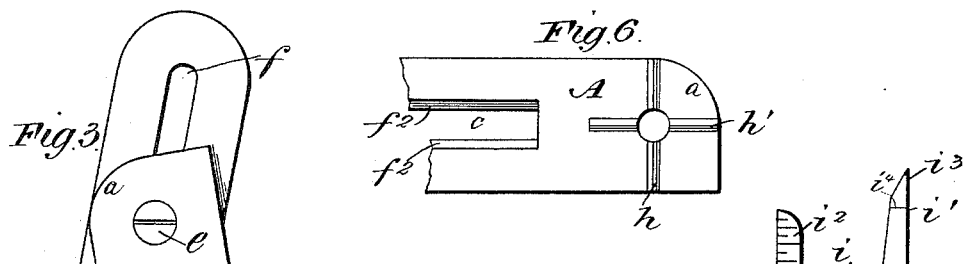
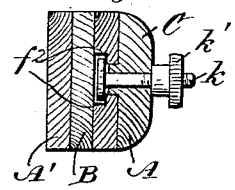
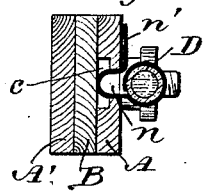
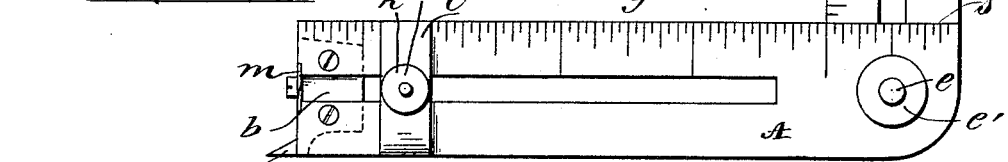
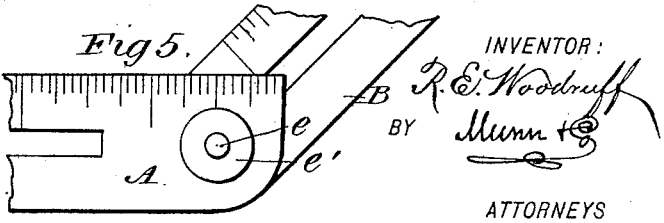
WITNESSES:
INVENTOR: R. E. Woodruff
BY Munn & Co.
ATTORNEYS

UNITED STATES PATENT OFFICE.

RICHARD E. WOODRUFF, OF TORONTO, CANADA.

COMBINED RULE, SQUARE, BEVEL, SCRIBE-GAGE, SPIRIT-LEVEL, AND DIVIDERS.

SPECIFICATION forming part of Letters Patent No. 439,458, dated October 28, 1890.

Application filed February 10, 1890. Serial No. 339,881. (No model.)

*To all whom it may concern:*

Be it known that I, RICHARD E. WOODRUFF, of Toronto, in the Province of Ontario and Dominion of Canada, have invented a new and useful Improved Combined Rule, Square, Bevel, Scribe-Gage, Spirit-Level, and Dividers, of which the following is a full, clear, and exact description.

My invention relates to an improved implement for the use of wood and iron workers, and has for its object to produce a compact combination of correlative tools—such as a rule, square, bevel-indicator, scribe-gage, spirit-level, dividers, and caliper-gage—which may be used as needed, requiring but slight alterations in adjustment to render any tool available.

To this end my invention consists in the peculiar construction and combinations of parts, as is hereinafter described and claimed.

Reference is to be had to the accompanying drawings, forming a part of this specification, in which similar letters of reference indicate corresponding parts in all the figures.

Figure 1 is a side view of the complete implement in folded condition. Fig. 2 is an edge view of two sections joined at one end, other parts of the device being removed. Fig. 3 is a side view of the principal portions of the implement adjusted to be used as dividers. Fig. 4 represents the main parts secured to form a square. Fig. 5 is a view of the parts broken, the joint portions being shown connected to produce a bevel tri-square or indicator. Fig. 6 is an inner side view of a section of the implement broken, the joint end being shown. Fig. 7 is a view of the end of the device in folded adjustment, as indicated by the arrow in Fig. 1. Fig. 8 is a transverse section of the parts folded, as represented by the line 8 8 in Fig. 1; and Fig. 9 is a cross-section on the line 9 9 in Fig. 1.

There are two pieces A A' provided, of equal size and similar contour. These are made of any suitable material, and consist of elongated strips, which are parallel on the side edges and have one adjacent end on each rounded on mating-corners, as at $a$. The other ends of these sides of a sectional stock are joined together sidewise, a block $b$ being introduced to hold them spaced apart throughout their length, said block having a slight taper toward the outer edge, which conforms with the ends of the pieces A A', whereby these pieces are caused to diverge, as shown in Fig. 2. The block $b$ may be integral with piece A', or separated, as preferred.

A transversely-central longitudinal slot $c$ is produced in the side piece A of a sufficient length, preferably about three-fourths the entire length of the piece, and is thus divided into parallel portions, which are joined together by the block $b$, screws being introduced through the block and lapped ends of the frame-section. The frame-section is graduated on one edge to indicate inches and fractions of the same as a rule, and a projecting point $d$ is formed on the block $b$, which latter is made of hard metal.

The divergent ends of the sectional pieces A A' are perforated at a proper point for the introduction of a screw $e$, that is inserted through the side A' into the side A, projecting from the latter sufficiently to receive the thumb-nut $e'$, which is adapted to clamp the separated ends upon a blade-piece B, which is located between the sections A A' and has loose engagement with them sidewise.

As shown in Fig. 1, the blade-piece B is longer than the sections A A', its edges conforming with the side edges of these pieces when in folded adjustment, a longitudinal transversely-central slot being therein formed, which is of about one-half of the length of the blade and extends from a point $f$ to the point $f'$, (see Fig. 3,) said slot being intended to receive the bolt or screw $e$, which, with the thumb-nut $e'$, may be utilized to clamp the sections A A' upon the blade and hold it wherever desired. The piece B is also graduated on one edge.

On the end of the blade-piece B, near the slot terminal $f$, is rounded, and a V-shaped groove $g$ is made therein opposite the point $f$ and at right angles to the sides of the blade, a central longitudinal groove $g'$ being formed in the same side of the blade extending from the point $f$ to the edge of the blade, as shown in Fig. 1.

On the inner surface of the section A projecting ribs $h\, h'$ are formed, which are adapted to register with the grooves $g\, g'$ when the parts are adjusted to hold the blade extended in a right line with the stock A A' or when a square is formed of the parts, as shown in Fig. 4, the interlocking of the ribs and grooves causing the blade to assume a correct relative position, thus dispensing with preliminary trial to secure the desired location of the blade B, either to form a square or a ruler-extension on the stock A A'.

The free end $i$ of the blade-piece B is notched, as shown in Fig. 4, the limbs $i'$ $i^2$ thus produced being shaped on their inner edges to fit the marginal edge of the block $b$ when the blade is slid into the position shown in Fig. 1, the longer limb $i'$ being pointed at $i^3$ to mate the point $d$ on block $b$, said points being provided to permit the blade B and stock A A' to be utilized as dividers when these pieces are arranged as shown in Fig. 3, the bolt $e$ and its thumb-nut $e'$ serving to hold them at any angle required.

When the blade B is adjusted, as shown in Fig. 4, by slacking the thumb-nut $e'$ the ends of the joined stock A A' will spread apart sufficiently to remove the rib $h$ from its mating-groove $g$, and thus allow the blade to be moved on the bolt $e$ as a pivot, when an adjustment may be effected to form a bevel-indicator implement, any degree of angularity of the blade B to the stock being attainable, said adjustment of parts being illustrated in Fig. 5.

A sliding block C is secured transversely on the slotted side A of the stock by a bolt $k$ and its thumb-nut $k'$, said bolt having its head located in the rabbeted edges $f^2$ of the longitudinal slot in the section A, said rabbeted recesses being shown in Figs. 6 and 8. This method of connecting the sliding block allows it to be longitudinally adjusted on the stock at any point from the block $b$ to the slot-terminal $f$.

On the end of the block $b$ a scribe-blade $m$ is secured adjustably, as shown in Fig. 7, thus completing a scribing-gage, the rule-graduations on the side of the stock A affording a means for setting the block C at a correct point without other measure.

When it is desired to use the device as a caliber-gage to determine the exact interior diameter of a cylinder or measure the space between two shoulders on any object, the blade B is extended in a right line from the stock, the points $i^3$ $d$ being used as gage-points, the graduations on the side of the stock A and blade B indicating the caliber when the length of the point $d$ and the point $i^2$ from $i^4$ to the end is added to the sum exhibited on the rule-graduations in sight.

The spirit-level D is mounted on one edge of the clip-plate $n$, which is bent from elastic metal into U shape of a width to fit closely in the longitudinal slot of the piece A, a flange $n'$, that is bent outwardly from the level-tube, resting on the face of this frame-piece when the clip-plate is sprung into the slot, thus providing a level attachment which is removable and accurate, as when the pieces A A' are clamped upon the blade B their opposite sides are rendered parallel, so that if the tube-case of the level is a true cylinder and the tube properly adjusted to locate its air-bubble at the center thereof when on a level plane the simple act of inserting the clip-plate within the slot until the flange $n'$ engages the piece A will level the spirit-tube properly. The extension of the blade-piece B in alignment with the pieces A A' affords a graduated rule and also a ruler to lay off straight lines.

As represented in Fig. 4, the square formed is available for testing and measurement of objects on its inner surface. Should it be desired to employ the square-blade to try the truth of objects and measure the same by using the outer edge, the blade B can be extended in the opposite direction, which will locate the graduated edge to mate with the edge $s$ on the stock A.

It is apparent from the foregoing description that the combination implement presented embodies in compact form several useful tools which are usually needed to lay off and test work and are ordinarily formed separately. These being the most essential correlative implements required by wood or iron workers to project and test the truth of parts in progress of construction, a combination of the same to permit them to be carried as one piece in the pocket affords a useful, convenient, and unique device.

Having thus described my invention, what I claim as new, and desire to secure by Letters Patent, is—

1. The combination, with a stock comprised of two equal-sized strips or side pieces joined at one end, one piece being slotted longitudinally a part of its length, of a slotted blade-piece located between the spaced sides of the main section, a screw-bolt and nut to clamp these pieces, and an adjustable spirit-level, which is located in the slot of the stock, substantially as set forth.

2. The combination, with a stock having two equal-sized side pieces held spaced apart by a slightly-tapered block at one end of these pieces and said longitudinally-tapered block, of a slotted blade-piece intermediate of the main-section side pieces, a screw-bolt and nut which are adapted to clamp these pieces, a longitudinal rib on the inner surface of one side piece of the stock, which mates a transverse groove in the blade-piece near one end and holds the blade at right angles to the stock when the rib and groove are interlocked, substantially as set forth.

3. The combination, with two side pieces of a stock, one piece longitudinally slotted, a spacing-block secured between the side pieces at one end, and a scribe-blade on this spacing-block, of a slotted blade-piece which is made to loosely fit between the sides of the stock, a transverse sliding block on the main section held adjustably, and a screw-bolt and nut, which bolt may slide in the longitudinal slot of the stock, substantially a set forth.

4. The combination, with a stock comprised of two side pieces having parallel edges, one side being longitudinally slotted and graduated on its edge, and a spacing-block secured between these sides at one end provided with a point on its end near one side edge of the stock, of a slotted graduated blade-piece having a mating-point on one end, and a longitudinal groove which receives a rib that is on the inner surface of the stock side piece, and a set-screw bolt and nut to clamp the main section and blade-piece in alignment with each other, substantially as set forth.

RICHARD E. WOODRUFF.

Witnesses:
JOSEPH E. ARMSTRONG,
BYRON E. D. ARMSTRONG.